US009639135B2

(12) United States Patent
Brooks et al.

(10) Patent No.: US 9,639,135 B2
(45) Date of Patent: May 2, 2017

(54) POWER CONSUMPTION LIMIT ASSOCIATED WITH POWER OVER ETHERNET (POE) COMPUTING SYSTEM (75) Inventors: Robert C Brooks, Houston, TX (US); Jeffrey C Stevens, Spring, TX (US); Patrick L Ferguson, Cypress, TX (US); Charles N Shaver, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 180 days.

(21) Appl. No.: 14/232,918

(22) PCT Filed: Jul. 18, 2011

(86) PCT No.: PCT/US2011/044317
§ 371 (c)(1),
(2), (4) Date: Jan. 15, 2014

(87) PCT Pub. No.: WO2013/012411
PCT Pub. Date: Jan. 24, 2013

(65) Prior Publication Data
US 2014/0208140 A1 Jul. 24, 2014

(51) Int. Cl.
G06F 1/32 (2006.01)
G06F 1/28 (2006.01)
(Continued)

(52) U.S. Cl.
CPC .............. *G06F 1/3206* (2013.01); *G06F 1/28* (2013.01); *G06F 1/3265* (2013.01); *H04L 12/10* (2013.01);
(Continued)

(58) Field of Classification Search
CPC .......... G06F 1/26; G06F 1/3206; G06F 1/324; G06F 9/4893; G06F 1/3296; G06F 1/3287; G06F 19/3418; G06F 1/3203
See application file for complete search history.

(56) References Cited

U.S. PATENT DOCUMENTS 7,509,505 B2 3/2009 Randall et al.
7,650,519 B1 1/2010 Hobbs et al.
(Continued)

FOREIGN PATENT DOCUMENTS

CN 101047514 10/2007
CN 101116285 1/2008
(Continued)

OTHER PUBLICATIONS

International Search Report and Written Opinion, International Application No. PCT/US2011/044317, Date of Completion: Feb. 20, 2012, Date of Mailing: Feb. 21, 2012, pp. 1-9.
(Continued)

*Primary Examiner* — Mohammed Rehman
*Assistant Examiner* — Alyaa T Mazyad
(74) *Attorney, Agent, or Firm* — HP Inc. Patent Department (57) ABSTRACT A computing system is associated with power consumption based on Power over Ethernet (PoE). Power consumption is compared to a threshold, and a signal is asserted that power consumption is to be limited based on the comparison to the threshold.

14 Claims, 7 Drawing Sheets (51) Int. Cl.
*H04L 12/10* (2006.01)
*H04L 12/40* (2006.01)

(52) U.S. Cl.
CPC .... *H04L 12/40045* (2013.01); *Y02B 60/1242* (2013.01)

(56) References Cited

U.S. PATENT DOCUMENTS

| | | | |
|---|---|---|---|
| 7,849,333 B2 | 12/2010 | Schindler | |
| 8,010,820 B1* | 8/2011 | Gilbrech | G06F 1/266 |
| | | | 713/300 |
| 2005/0062696 A1 | 3/2005 | Lo | |
| 2006/0161794 A1* | 7/2006 | Chiasson | G06F 1/28 |
| | | | 713/300 |
| 2008/0052546 A1 | 2/2008 | Schindler et al. | |
| 2008/0168287 A1* | 7/2008 | Berry | G06F 1/266 |
| | | | 713/323 |
| 2008/0256371 A1 | 10/2008 | Diab et al. | |
| 2009/0049317 A1* | 2/2009 | Gara | G06F 1/3203 |
| | | | 713/320 |
| 2009/0089481 A1* | 4/2009 | Kapoor | G06F 12/0246 |
| | | | 711/103 |
| 2009/0231440 A1 | 9/2009 | Lai et al. | |
| 2010/0052421 A1 | 3/2010 | Schindler et al. | |
| 2011/0001358 A1 | 1/2011 | Conroy et al. | |
| 2011/0080422 A1 | 4/2011 | Lee et al. | |
| 2011/0118888 A1 | 5/2011 | White | |
| 2011/0145612 A1* | 6/2011 | Gellerich | G06F 1/3203 |
| | | | 713/320 |
| 2012/0119816 A1* | 5/2012 | Rogers | G06F 1/3287 |
| | | | 327/434 |
| 2014/0229748 A1* | 8/2014 | Li | G06F 1/26 |
| | | | 713/300 |

FOREIGN PATENT DOCUMENTS

| | | |
|---|---|---|
| CN | 102113270 | 6/2011 |
| KR | 10-2005-0037126 A | 4/2005 |

OTHER PUBLICATIONS

Troubleshooting Power over Ethernet (PoE), Cisco Systems, Inc., Aug. 23, 2010, pp. 1-22, Available at: <cisco.com/en/US/docs/switches/lan/catalyst3750/software/troubleshooting/power_over_ethernet.html>.

Windows 7 Power Management, Apr. 28, 2009, pp. 1-6, Available at: <forums.techarena.in/guides-tutorials/1169697.htm>.

Extended EP Search Report, EP Application No. 11869684.8, dated Nov. 13, 2015, 10 pages.

\* cited by examiner

POWER CONSUMPTION LIMIT ASSOCIATED WITH POWER OVER ETHERNET (POE) COMPUTING SYSTEM

BACKGROUND

Networks, such as local area networks (LANs) and wide area networks (WANs), may distribute network data and power over the network using Power over Ethernet (PoE). PoE is specified in the Institute of Electrical and Electronics Engineers (IEEE) Standard 802.3 and other relevant standards, describing power delivery by a Power Sourcing Equipment (PSE) to a Powered Device (PD). The standards limit power delivery by the PSE to a power delivery envelope.

BRIEF DESCRIPTION OF THE DRAWINGS/FIGURES

The present examples will now be described with reference to the accompanying drawings. In the drawings, like reference numbers may indicate identical or functionally similar elements.

DETAILED DESCRIPTION

A Powered Device (PD), such as a computing system including an All-in-One (AiO) zero client, may draw power from a Power Sourcing Equipment (PSE) via Power over Ethernet (PoE). The PSE may impose a power budget that can constrain design choices of PDs, and power consumed by the PD may fluctuate over time, based on factors such as usage scenarios of the PD. A PSE may shut down power to a PD, in response to the PD attempting to draw power in excess of the available power envelope. Thus, design choices of PDs may be further constrained in view of power limitations to avoid shutdowns while accommodating variations in usage scenarios of the PDs and the accompanying power/usage scenarios. Accordingly, the PD may provide enhanced functionality by monitoring its own power consumption relative to a threshold associated with the power budget, and asserting a signal to limit its power consumption accordingly. Power consumption may be dynamically monitored and limited selectively, such as by reducing brightness of a display when total power consumption reaches and/or exceeds the threshold. Thus, the PD enables enhanced functionality, while dynamically complying with power budgets and avoiding being shut down by the PSE for exceeding the power budget.

Figure 1:
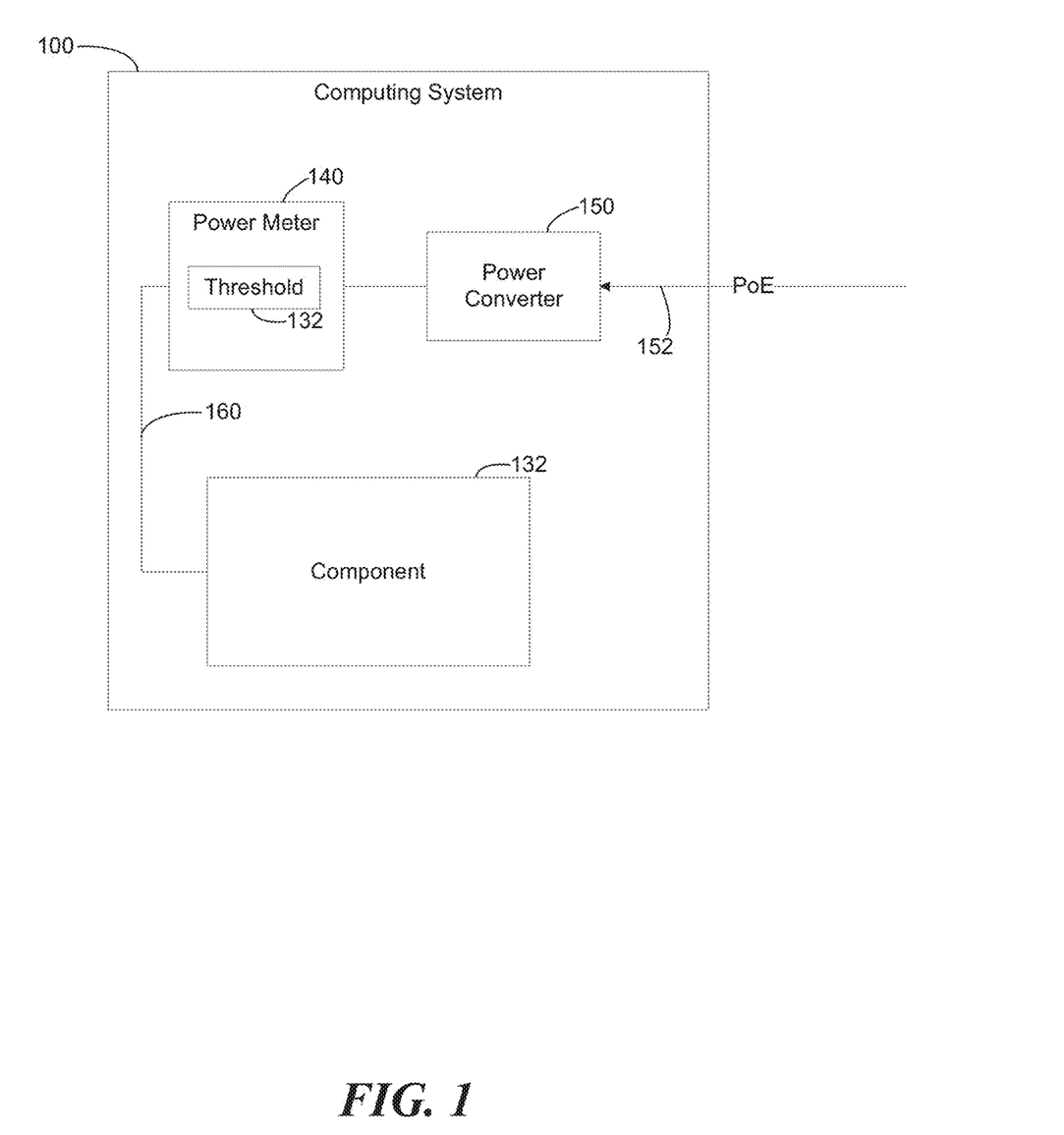
FIG. 1 is a block diagram of an architecture of a computing system including a power converter according to an example.

FIG. 1 is a block diagram of an architecture of a computing system 100 including a power converter 150 according to an example. Computing system 100 also includes power meter 140 and component 132. Computing system 100 may receive power at power converter 150 via Power over Ethernet (PoE) 152, which may be provided by a Power Sourcing Equipment (PSE) such as a switch and/or midspan (not shown in FIG. 1).

Power converter 150 may provide converted power to computing system 100, including component 132. Power meter 140 may monitor power consumption of the computing system 100, and compare the power consumption to threshold 132. For example, power meter 140 may determine power consumption based on output of power converter 150, and threshold 132 may correspond to a specified level of power output from power converter 150. Threshold 132 may be based on a PoE power class associated with computing system 100. For example, threshold 132 may correspond to an upper power limit for a type 1 PoE Powered Device (PD) of class 3, having an upper power limit of 12.95 Watts at the PD.

Power meter 140 may assert a signal 160 that is sent to component 132 of computing system 100. Signal 160 may indicate that power consumption is to be limited in view of power consumption compared to the threshold 132. Component 132 may adjust its power consumption based on signal 160. For example, component 132 may be a display that dims its brightness in response to signal 160, to reduce overall power consumption of computing system 100.

Figure 2:
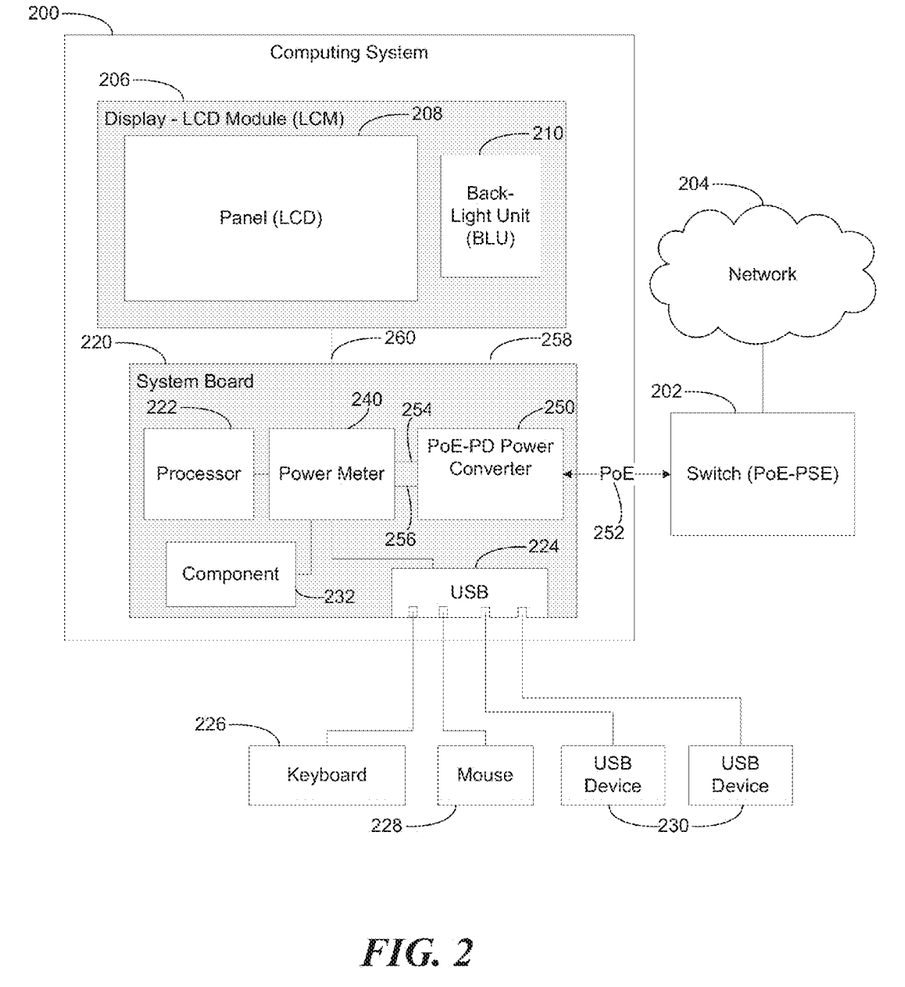
FIG. 2 is a block diagram of an architecture of a computing system including a power converter according to an example.

FIG. 2 is a block diagram of an architecture of a computing system 200 including a power converter 250 according to an example. Computing system 200 is connected to network 204 via switch 202. Switch 202 is a Power over Ethernet (PoE) Power Sourcing Equipment (PSE). Thus, switch 202 may provide power to the computing system 200 via PoE 252. PoE may also be provided in conjunction with a midspan (not shown) to inject power for PoE 252. Computing system 200 may include a system board 220, and may include a display 206.

Display 206 may be a Liquid Crystal Display (LCD) Module (LCM), including panel 208 and Back-Light Unit (BLU) 210. Display may include a back-light converter board (not specifically shown), such as a Light Emitting Diode (LED) driver for LED back-lighting.

System board 220 may include a processor 222, USB host 224, component 232 (including a network card, Local Area Network (LAN)-On-Motherboard (LOM), or other component for a computing system), power meter 240, and power converter 250. USB host 224 may be coupled to devices such as keyboard 226, mouse 228, and USB devices 230. Power converter 250 may receive power from switch 202 via PoE 252.

Power converter 250 is a PoE-powered device (PD) power converter. Power converter 250 provides power to computing system 200. For example, a component, such as BLU 210 or other components, may receive power directly from power converter 250 via unmetered power 258. Power converter 250 may provide power via a first voltage rail 254 and a second voltage rail 256. First voltage rail 254 and a second voltage rail 256 may be provided to power meter 240.

Power meter 240 may determine power consumption of computing system 200. For example, power meter 240 may determine power consumption based on first voltage rail 254 and/or second voltage rail 256. Power meter 240 may determine power consumption based on PoE 252 or other sources for determining or deriving power consumption.

Power meter 240 may include a shunt resistor to receive a voltage and measure a voltage drop across the shunt resistor to calculate power associated with that voltage.

Power meter 240 may monitor power consumed on first voltage rail 254, and estimate power consumption of second voltage rail 256 to determine total power consumption of computing system 200. Power meter 240 may distribute power to components of computing system 200. For example, power meter 240 may distribute power derived from the first voltage rail 254 to processor 222, USB host 224, and component 232. Power meter 240 may distribute power derived from the second voltage rail 256 to the display 206 and/or the BLU 210. Power meter 240, and/or components of computing system 200, also may further convert the first voltage rail 254 and/or the second voltage rail 256 to provide additional voltages.

Power meter 240 may provide a signal 260 to components of computing system 200. For example, power meter 240 may determine that power consumption of computing system 200 has exceeded a threshold, and send signal 260 to display 206, processor 222, USB host 224, and/or component 232. Signal 260 may indicate adjusting display 206 such that power consumption is reduced. BLU 210 may be instructed to dim the display 206 to reduce power consumption. Accordingly, power meter 240 may monitor first voltage rail 254, and cause reduction of power in a component (such as display 206) deriving power from the second voltage rail 256. Thus, computing system 200 may enable control of power consumption of components independently of power consumption that is monitored, isolating and improving accuracy of the monitoring.

The monitored power consumption may be used to determine power consumption of the entire computing system 200. For example, the computing system 200 may monitor and determine a first power consumption associated with the first voltage rail 254. The computing system 200 may also identify predetermined level of power consumption associated with the display 206 consuming power from the second voltage rail 256, based on a level of power limiting applied to the display 206. For example, the computing system 200 may identify that the display 206 is driven at 50% brightness associated with a known wattage. For a given display or other component, various levels of power consumption may be determined based on a correlation with various levels of power limiting. The computing system 200 may further identify additional sources of power consumption, such as power conversion/transmission losses and other operational losses. Thus, total power consumption of computing system 200 may be determined based on the monitored power consumption of the first rail, the estimated power consumption of the second rail, and additional losses. The computing system may, therefore, respond to an increase in monitored power consumption of the first rail by implementing power savings to decreasing estimated power consumption of the second rail.

Power meter 240 may signal various components so that computing system 200 operates in compliance with a power budget associated with PoE and the PSE. An example power budget may be based on available power of 13 watts. Power converter 250 may be associated with a conversion efficiency, such as 91%, resulting in approximately 11.83 watts of converted power available after power conversion. The computing system 200 may use this available power as follows, according to one example: system board 220, including keyboard 226 and mouse 228, may use 4.5 watts. Input/Output (I/O), via two USB devices 230 using 100 milliamps each up to a maximum of 500 milliamps each, may use 1 watt. A display driver hardware such as a scalar (not shown) associated with panel 208, may use 1.5 watts. The BLU 210 may use 0.24 watts+2.77 watts=3.01 watts. Panel 208 may use 1.8 watts. Thus, total power usage budget of example computing system 200 may be 4.5+1+1.5+3.01+1.8=11.81 watts, approximately, falling below the available PoE converted power budget of 11.83 watts.

Power savings can be realized in using efficient structures, while supporting a large screen (e.g., approximately 18.5 inches diagonal). High efficiency white light emitting diode (WLED) back lighting, emitted from an assembly of WLEDs for example, may be directed into a light guide/BLU to provide sufficient lighting while being powered by approximately 2.77 watts or less (depending on advancements in lighting technology). Thus, a LCM using such a BLU may consume 4.57 watts or less. The BLU may be associated with a top diffuser, back reflector, bottom diffuser, and prism. A contrast ratio may also be reduced to save power, while providing brightness of 200 nits (candelas per square meter) or greater using the BLU.

Figure 3:
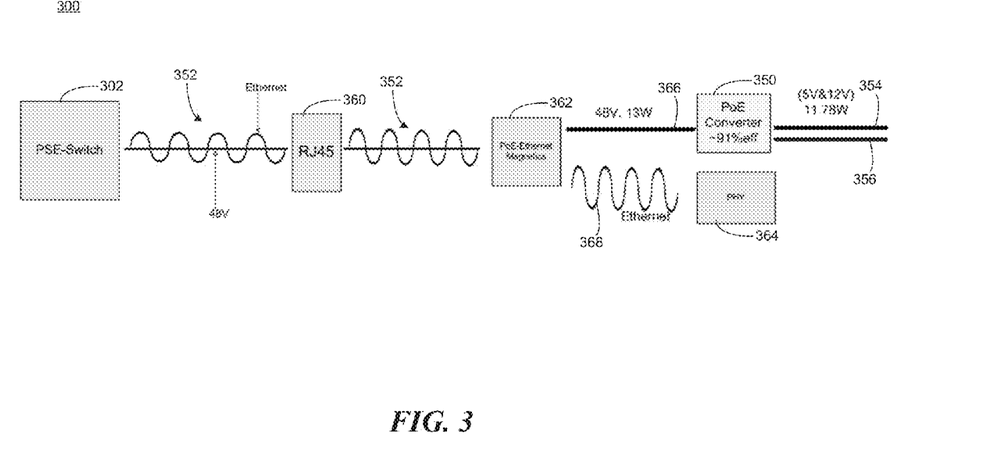
FIG. 3 is a block diagram of a Power over Ethernet (PoE) system including a power converter according to an example.

FIG. 3 is a block diagram of a Power over Ethernet (PoE) system 300 including a power converter 350 according to an example. System 300 further includes switch 302, network jack 360, Ethernet magnetics 362, and network physical layer (PHY) chip 364. System 300 may include a midspan (not shown) associated with switch 302 to inject power into PoE 352. For example, a non-PoE switch 302 may be used to provide network data, and a midspan may be used to provide PoE power.

Switch 302 is a PSE-switch, capable of providing power sourcing to powered devices interfacing with the switch 302. Switch 302 may provide power using PoE 352. PoE 352 includes an Ethernet signal and power, illustrated as 48 volts. Network jack 360, illustrated as registered jack 45 (RJ45), may interface with switch 302 to send/receive PoE 352. RJ45 may include eight pins to carry signals, including power and Ethernet, simultaneously.

PoE 352 is received at Ethernet magnetics 362, where power 366 is separated from Ethernet 368. Ethernet 368 may be sent to the PHY chip 364, and power 366 may be sent to the power converter 350. As illustrated, the power sourcing equipment (PSE) switch 302 may provide 13 Watts of power, including providing power at 48 volts. The PSE may provide up to 15.4 Watts according to PoE specifications, such that a powered device (PD) is guaranteed 13 Watts at the PD. PoE specifications allow for 2.4 Watts to be lost in cable/transmission. The illustrated values of 13 Watts and 48 Volts are associated with type 1 PoE, and represent values with valid ranges and may vary depending on specific implementations/types/classes.

Power converter 350 may convert the power 366 from Ethernet magnetics 362 to various voltage levels, such as 3.3 volts, 5 volts, 12 volts, 30 volts, 48 volts, and others, including voltages based on needs of chips, power rails, and other components of the computing system. Converter 350 may be associated with an efficiency, such as approximately 91%, providing approximately 11.8 W from the available 13 W from Ethernet magnetics 362. Power converter 350 may provide first voltage rail 354 and second voltage rail 356, which may carry separate, independent voltage levels. Additional voltage rails are possible, and voltage rails may be enhanced by further conversion, dividing, and/or boosting.

Power from PoE may be provided by PSE switch 302 to a powered device (computing system) based on a power class associated with the computing system. The power class may be associated with a standard, such as IEEE 802.3-2008 (full spec) & IEEE 802.3 AT-2009 (addendum), specifying classes of power between a PSE and a powered device (PD) drawing power from the PSE via PoE. The class may be associated with a type of PoE PSE, such as a type 1 PSE device and a type 2 PSE device. The computing system PD may be a type 1 device compatible with type 1 or type 2 PSE devices. Compliance with type 1 enables benefits by more readily taking advantage of available infrastructure. Additional benefits include cost savings due to lower power requirements.

A powered device may make its readiness known to the PSE, and indicate its PoE class, by presenting specified resistance values to interfaces with the PSE. A powered device may draw power according to the class, and the PSE may terminate power delivery if the powered device draws excessive power for the power class requested by the device. Thus, the available power provided by PoE is not unlimited. For an example class, a device may draw approximately 13 watts at 48 volts, which corresponds to drawing approximately 270 milliamps of current. Actual values may vary from nominal values listed in the specification, and example PDs may monitor power, current, and/or voltage for determining actual values (e.g., monitoring actual power and current to derive actual voltage). Thus, it is beneficial to use the available power for a power class of powered devices, without running afoul of the power limitations associated with the class that may result in the PSE removing power causing shutdown of the powered device.

Examples herein may request available power for a power class, and be capable of dynamically using that power to its fullest while allowing for variations in usage scenarios of the computing system/powered device. The variations in usage scenarios can affect power drawn from the PSE according to the power class, including drawing additional power beyond the power class but within tolerances of the power class according to PoE specifications. For example, PoE standards may permit a powered device to draw limited current peaks that increase the instantaneous power above the nominal limits, in view of the average power requirements. Power usage by the powered device is enhanced for a given power class budget, without resorting to renegotiating or otherwise switching to a different power class. Furthermore, a PSE may be specified to provide power at a greater limit than power specified to be drawn by a powered device. For example, a PSE may be specified to deliver 15.4 watts, compared to the specification for a powered device specifying drawing only 12.95 watts (e.g., accounting for power losses due to interface connections/cable loss between the PSE and the PD).

Figure 4:
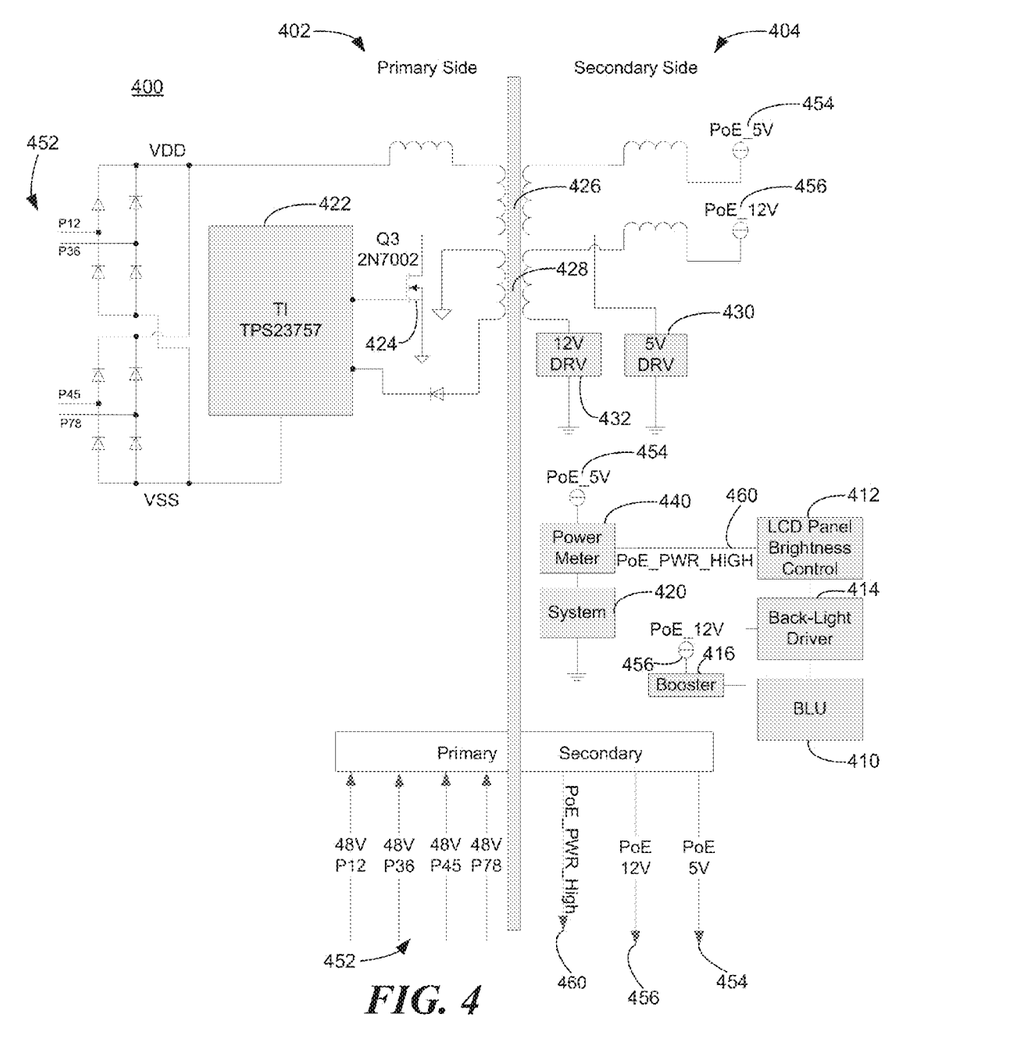
FIG. 4 is a circuit block diagram of a power converter according to an example.

FIG. 4 is a circuit block diagram of a power converter 400 according to an example. Power converter 400 includes a primary side 402 and a secondary side 404. The primary side 402 is associated with input from PoE 452. For example, power converter 400 may receive 48 volt inputs on four lines of PoE 452, labeled as P12, P36, P45, and P78. The four lines may correspond to signals output from PoE magnetics (e.g., Ethernet magnetics 362, see FIG. 3), which strip off a Direct Current (DC) voltage from the Ethernet transmit (TX) and receive (RX) pairs. Output may be received from standard interconnection pins of an Ethernet plug/jack carrying PoE 452. VDD and VSS may be derived from PoE 452, using a network of diodes as illustrated (including a diode bridge), for example. VSS may be applied to converter processor 422. VDD may be applied to an inductor, a first transformer winding 426, and transistor 424. Transistor 424 may open and close according to input from converter processor 422. Converter processor 422 also may interface with second transformer winding 428 via a diode. In the illustrated example, converter processor 422 is a Texas Instruments TPS23757 chip, a High Efficiency PoE Interface and DC/DC Controller. Other chip(s) and/or circuitry may be used to provide the primary side 402, and to provide and interface with the secondary side 404. One transformer may be used to provide first transformer winding 426 and second transformer winding 428, which may be located around the same transformer core.

Secondary side 404 is associated with providing first voltage rail 454 and second voltage rail 456. Values of 5 V and 12 V are shown, although other voltage values are possible in alternate examples. First voltage rail 454 receives power via first transformer winding 426. Second voltage rail 456 receives power via second transformer winding 428. First transformer winding 426 interfaces with first driver 430, and second transformer winding 428 interfaces with second driver 432. First driver 430 and second driver 432 may operate synchronously with the turning on and off of the transistor 424 to operate the first transformer winding 426 and second transformer winding 428. Circuitry may operate as a flyback converter.

Secondary side 404 is also associated with power meter 440, system 420, brightness control 412, back-light driver 414, booster 416, and back-light unit 410. First voltage rail 454 may be provided to power meter 440, which can determine power consumption of system 420, which may include power consumption of back-light unit 410 and other units. Power meter 440 may assert signal 460 to brightness control 412, indicating a high-power state of the computing system 420 such that power is to be limited. Brightness control 412 may provide a signal to back-light driver 414, such as a Pulse-Width Modulated (PWM) signal indicating a duty cycle, wherein the duty cycle may be reduced according to signal 460 to reduce brightness. Back-light driver 414 may receive power from booster 416, which may derive a boosted signal from second voltage rail 456. For example, a boosted voltage of 30 Volts may be provided to back-light driver 414. Thus, back-light driver 414 may drive the back-light unit 410 to provide controlled brightness based on the first voltage rail 454, signal 460, and the second voltage rail 456.

Figure 5:
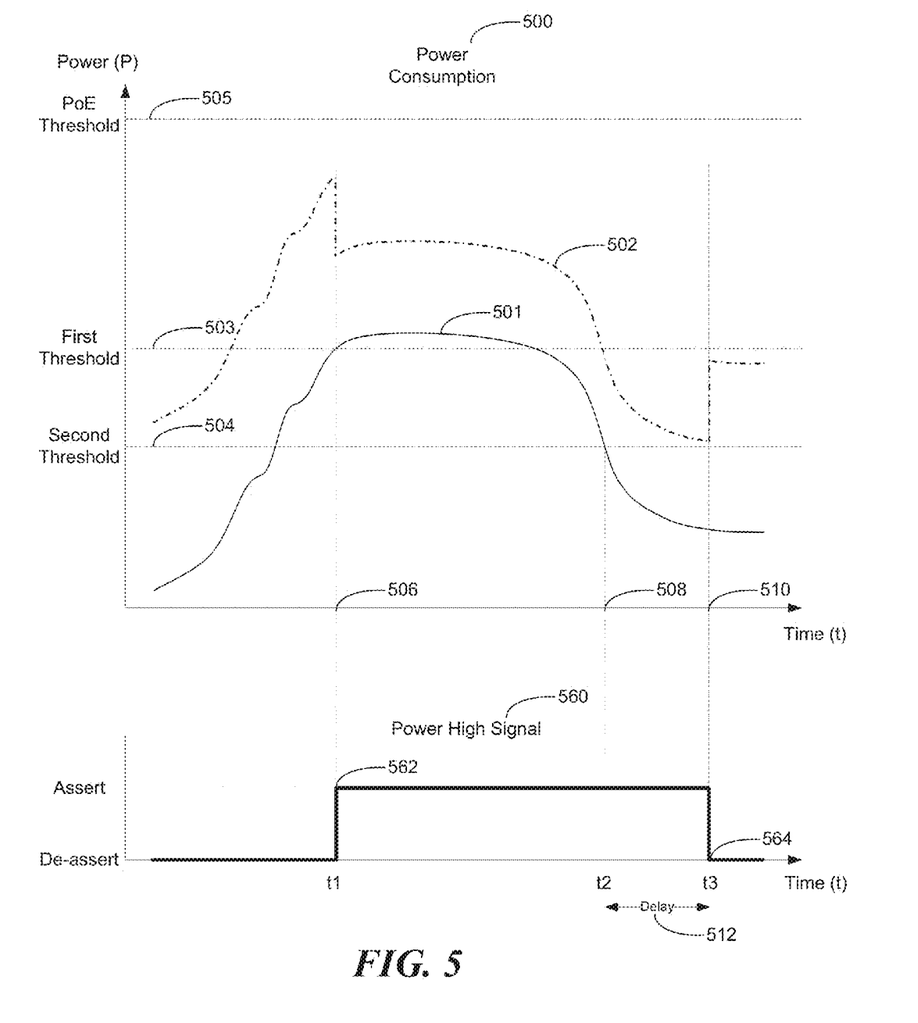
FIG. 5 is a graph of power consumption and a power high signal over time according to an example.

FIG. 5 is a graph of power consumption 500 and a power high signal 560 over time according to an example. Power consumption 500 may vary over time, depending on operations performed and components powered according to various usage scenarios. A computing system according to examples herein may have the capability of utilizing a power envelope associated with the computing system, without risking being shut-down by a PSE providing PoE to the computing system.

Power consumption 500 may include a first power consumption 501 based on consumed power associated with a first voltage rail, and a combined power consumption 502 based on consumed power associated with both the first voltage rail and the second voltage rail. First power consumption 501 may be monitored regarding first threshold 503 and second threshold 504. Based on first power consumption 501, a computing system may control a component using the second voltage rail, to affect combined power consumption 502.

Accordingly, combined power consumption 502, including power consumption based on the first voltage rail and the second voltage rail, may avoid exceeding PoE Threshold 505. A computing system also may be associated with additional power consumption (not shown in FIG. 5), such as losses due to transmission and conversion of power, generation of heat, various components, and other losses.

Such additional power consumption may be accounted for in association with first threshold 503, second threshold 504, and PoE threshold 505, to avoid exceeding the PoE threshold 505. A total power consumption of the computing system may be affected by various types of power consumption that may be factored into usage scenarios.

First power consumption 501 may represent an example usage scenario such as insertion, initialization, and access of a Universal Serial Bus (USB)-powered hard drive storage device, that consumes power from the first voltage rail. First power consumption 501 rises initially upon inserting the USB device, continuing to rise as the USB device's hard drive consumes power to spin up and initialize. First power consumption 501 levels off and falls to a steady state as the hard drive finishes initializing and is accessed to read/write data then transition into an idle state. Other usage scenarios and power consumption patterns are possible, depending on the type and combination of components and devices used, including what voltage rail is used. Other usage scenarios include the computing system decoding and displaying a processor-intensive audio/video stream displaying alternating colors and contrast at full brightness. Power consumption may fluctuate according to instantaneous blips of activity or sustained usage. Displaying a visual pattern on screen may affect power draw dynamically, such as displaying full-screen alternating black-and-white pixels.

Combined power consumption 502 may include first power consumption 501 corresponding to the first voltage rail, and additional power consumption corresponding to the second voltage rail. Combined power consumption 502 may be vertically offset from first power consumption 501 corresponding to additional power consumption of the second voltage rail, for example by back-light usage. Thus, dimming the backlight may reduce power consumption of the second voltage rail, and accordingly may reduce the vertical offset separating the first power consumption 501 and the combined power consumption 502. Combined power consumption 502 may represent an approximation, that may ignore various incidental power consumption and other losses. Reducing combined power consumption 502, and correspondingly reducing total computing system power consumption, enables power consumption 500 to remain within a PoE threshold 505 to avoid power shut down by the PSE.

At time t1 506, first power consumption 501 reaches first threshold 503, which triggers assertion 562 of power high signal 560. Signal 560 may be asserted 562 when first power consumption 501 is within a power range or time range (minimum assertion width) of first threshold 503, including when below first threshold 503. Assertion 562 of power high signal 560 may indicate that power saving measures may be appropriate. For example, a power meter may assert the power high signal 560 to instruct a back-light unit to reduce power consumption and dim the backlight. Accordingly, also at time t1 506, combined power consumption 502 is shown decreasing by an amount of power saved by dimming the backlight. In the illustrated example, the combined power consumption 502 includes one incremental decrease corresponding to one incremental dimming of the back-light. In alternate examples, the back-light may be dimmed based on many increments, such that combined power consumption 502 may be reduced based on many incremental steps. Other components of a computing system, such as a processor, may include incremental power savings. Assertion 562 of power high signal 560 may include an indication of the incremental amount that power savings are to be implemented for a component.

Assertion 562 of power high signal 560 may indicate various amounts by which to reduce power consumption 500. For example, an amount by which power is to be reduced may be associated with the extent to which first power consumption 501 may exceed first threshold 503.

In the example usage scenario after time t1 506, first power consumption 501 drops below first threshold 503 and continues toward second threshold 504. Power high signal 560 remains asserted 562 after first power consumption 501 drops below first threshold 503. Thus, hysteresis is involved with assertion 562 and de-assertion 564 of the power high signal 560, because different thresholds may be involved with changes of state in power high signal 560, and previous state(s) of the power high signal 560 may be involved in changes to its current and/or future state(s). For example, the power high signal 560 may be asserted 562 at the first threshold 503 if the power high signal 560 was previously in a state of de-assertion 564. The power high signal 560 may be de-asserted at the second threshold 504, if the power high signal 560 was previously in a state of assertion 562. The de-assertion 564 also may depend on delay 512.

Delay 512 enables power high signal 560 to remain asserted 562 after first power consumption 501 drops below second threshold 504. Thus, even when first power consumption 501 drops rapidly and passes below first threshold 503 and second threshold 504 as shown, de-assertion 564 may be delayed to guarantee a minimum amount of time that power high signal 560 remains asserted 562. Thus, a computing system may control transitions between assertion 562 and de-assertion 564, independently of power loads and situations where the computing system quickly returns to a low power state. Such control may avoid distraction that would be caused if the screen were to dim and brighten in rapid succession, based on power consumption changes alone. Thus, examples may avoid visual "chatter" where a display flickers or pulses between dimmed and non-dimmed modes. Use of independent power sources (e.g., independent first and second voltage rails) may also help prevent chatter, by enabling monitoring of first power consumption 501, whose power consumption is independent of adjustments made to power consumption of the second voltage rail.

At time t3 510, the power high signal 560 is de-asserted 564. T3 510 may be calculated based on time t2 508 and delay 512. After time t3 510, the power high signal 560 may remain de-asserted 564 until power consumption reaches the vicinity of first threshold 503. Thus, the example power consumption 500 envelope shown in FIG. 5 allows for a large range of power consumption scenarios, without visual chatter or other drawbacks that potentially may be associated with operating under reduced power consumption.

Figure 6:
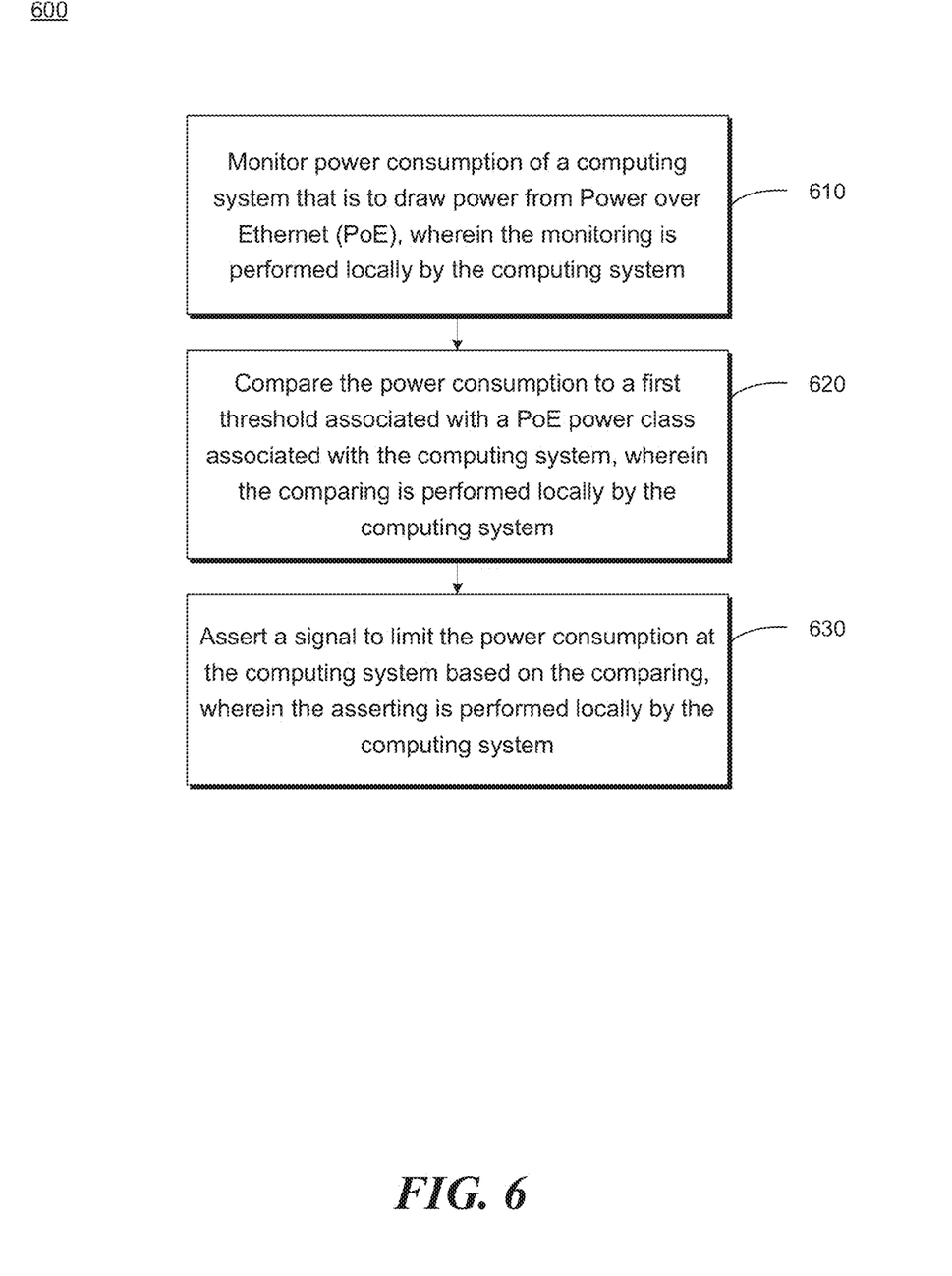
FIG. 6 is a flow chart based on power consumption of a computing system according to an example.

FIG. 6 is a flow chart 600 based on power consumption of a computing system according to an example. Step 610 includes monitoring power consumption of a computing system that is to draw power from Power over Ethernet (PoE), wherein the monitoring is performed locally by the computing system. The monitoring may be based on power drawn from the PoE, power consumed by a power converter, power consumed by components receiving various voltage outputs from the power converter, and/or alternate techniques of monitoring power consumption including deriving power consumption of a first component based on power consumption of a second component. Step 620 includes comparing the power consumption to a first threshold associated with a PoE power class associated with the computing system, wherein the comparing is performed locally by the computing system. For example, the computing system can maximize use and functionality of available power while avoiding exceeding power envelope limits of a PoE power class associated with the computing device. The computing system may exceed a nominal power limit for a duration of time, then reduce power consumption and avoid shutdown of the supplied PoE. A computing system can benefit from an expanded power envelope, while avoiding remote shutdown of supplied power caused by exceeding the nominal power envelope. Step 630 includes asserting a signal to limit the power consumption at the computing system based on the comparing, wherein the asserting is performed locally by the computing system. Thus, the computing system may control itself to avoid conflicting with power envelope limits imposed remotely by the power sourcing equipment, providing benefits of a bottom-up approach to managed power consumption for powered devices interfacing with a PoE power source.

Figure 7:
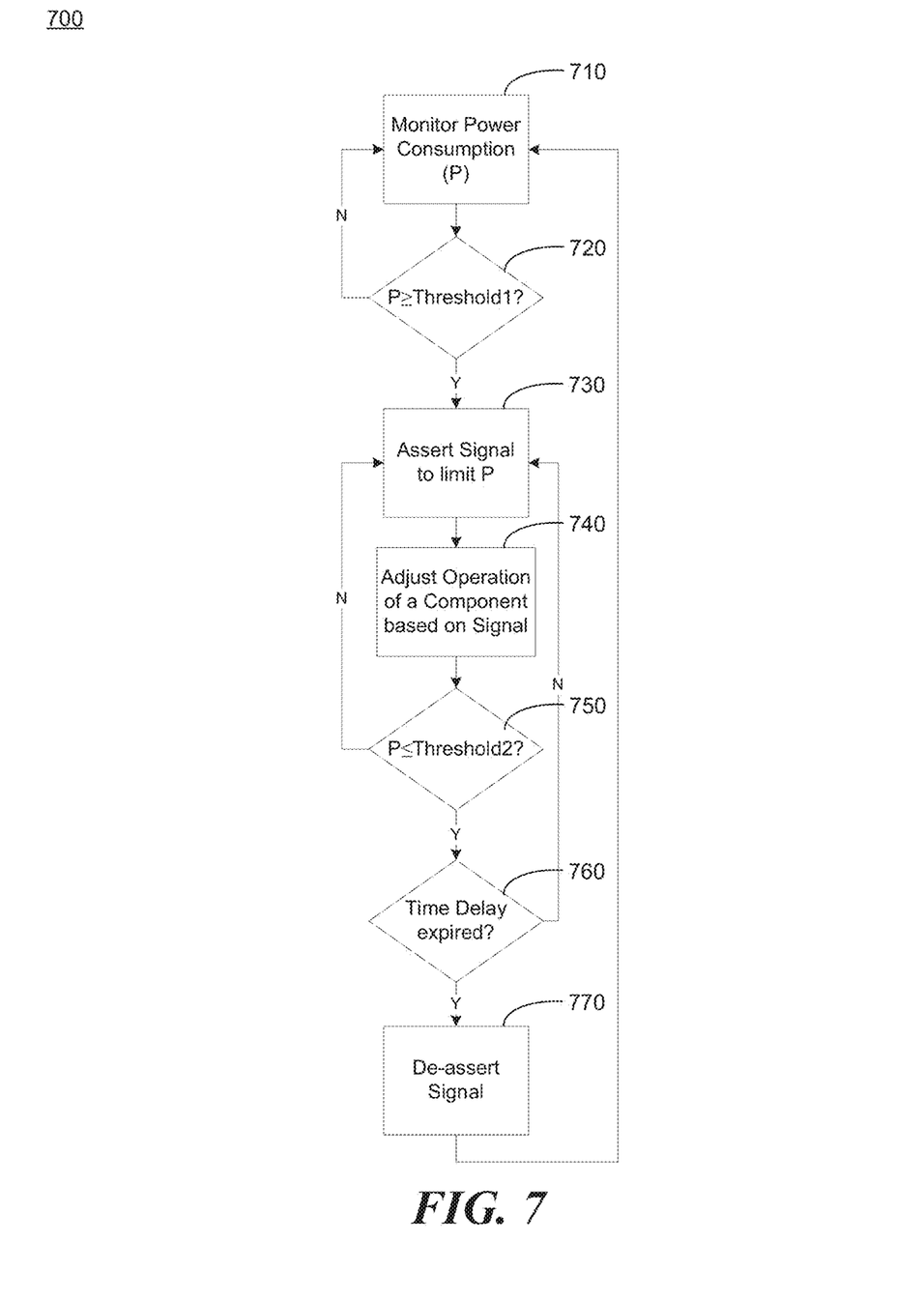
FIG. 7 is a flow chart based on power consumption of a computing system according to an example.

FIG. 7 is a flow chart 700 based on power consumption of a computing system according to an example. In step 710, the computing system monitors its power consumption. In step 720, the computing system compares power consumption to a first threshold. In the illustrated example, the comparison tests whether power consumption is equal to or greater than the first threshold. However, in alternate examples, the comparison may test whether power consumption is within a range of the first threshold (based on a range of time or a range of amount, etc.). The comparison may be expressed as: "|P−Threshold1|≤Range1?" The comparison may also check a current and/or previous state of signal assertion. In an example, a first power consumption limitation may trigger when a first power consumption is within a range of one watt to the threshold, and a second power consumption limitation may trigger when first power consumption is equal to the threshold. Different ranges may be used for different power consumptions, such as using a higher trigger threshold range for power consumptions that fluctuate widely. The comparison may also take into consideration a present/past power consumption level and its proximity to a threshold, when asserting a signal that power consumption changes are to be made. For example, the computing system may decrease power consumption more aggressively when power consumption is near a threshold. Power consumption may be decreased based on a varying scale over time. For example, a back-light duty cycle can be reduced successively by 10%, then by 20%, then by 50% over time if power consumption remains within a range of a threshold despite earlier power consumption reduction signal assertions. Other variations and combinations are possible in alternate examples.

If the comparison in step 720 is not satisfied, execution of the flow chart 700 returns to step 710. If the comparison in step 720 is satisfied, execution proceeds to step 730. In step 730, the computing system asserts a signal to limit power consumption. For example, the computing system may assert PoE_PWR_HIGH signal 460 illustrated in FIG. 4. In step 740, the computing system adjusts operation of a component based on the signal, i.e., the signal asserted in step 730. For example, the computing system may adjust brightness and/or processor operation to limit power consumption. The types of adjustments to limit power consumption may be indicated in or derived from the asserted signal and/or past/present power consumption and signal conditions/states.

In step 750, the computing system compares power consumption to a second threshold. In the illustrated example, the comparison tests whether power consumption is equal to or less than the second threshold. However, in alternate examples, the comparison may test whether power consumption is within a range of the second threshold. The comparison may be expressed as: "|P−Threshold2|≤Range2?", for example. The comparison may also take into consideration current and previous power consumption and signal assertion states, and may be associated with additional features set forth above, such as features associated with step 720.

If the comparison in step 750 is not satisfied, execution of the flow chart 700 returns to step 730. If the comparison in step 750 is satisfied, execution proceeds to step 760. In step 760, the computing system determines if a time delay is expired, e.g., delay 512 shown in FIG. 5. If the time delay is not expired, execution returns to step 730. If the time delay is expired in step 760, execution proceeds to step 770. In step 770, the computing system de-asserts the signal associated with limiting power consumption. Execution proceeds to step 710, completing a circuit of all steps of the feedback loop associated with monitoring power consumption. Thus, a computing system may fully utilize a power envelope associated with a corresponding PoE power class.

The breadth and scope of the present invention should not be limited by any of the above-described examples, but should be defined in accordance with the following claims and their equivalents.

What is claimed is:

1. A computing system comprising:
   a power converter to draw power from Power over Ethernet (PoE) to power the computing system with an amount of available PoE converted power;
   a power meter to compare a total amount of converted PoE power consumption of the computing system on a first voltage rail to an upper threshold corresponding to a PoE power class associated with the computing system, and assert a signal indicating that the total converted PoE power consumption of the computing system is to be limited based on the comparison to the upper threshold; and
   a display including backlight, wherein converted PoE power consumption of the display is limited based on the signal so a total amount of converted PoE power consumption of display is less than the amount of available PoE converted power, wherein the display including the backlight that derives power only from a second voltage rail that is separate and distinct from the first voltage rail and wherein the backlight varies in brightness as converted PoE power provided via the second rail to the backlight varies, wherein the power meter is to:
   compare the total converted POE power consumption of the computing system to a second threshold;
   maintain assertion of the signal based on the power consumption exceeding the second threshold; and
   de-assert the signal based on the power consumption being below the second threshold; and
   wherein at least an amount of power provided to a processor in the computing system is not limited.

2. The computing system of claim 1, wherein the power converter is to provide power comprising a first voltage and a second voltage, the power meter is to compare power consumption based on the first voltage, and the component is to be powered based on the second voltage.

3. A power converter of a computing system, comprising:
   an input to receive Power over Ethernet (PoE) from power sourcing equipment;
   a transformer to convert the PoE received from the power sourcing equipment to an amount of available PoE converted power provided by a first voltage rail;

a power meter to determine a total amount of converted PoE power consumption of the computing system based on the converted power provided by at least the first voltage rail, compare the total amount of converted PoE power consumption to an upper threshold corresponding to a PoE power class associated with the computing system, and assert a signal indicating that the total converted PoE power consumption of the computing system is to be limited based on the comparison to the upper threshold so a total amount of converted PoE power consumption of the computing system is less than the amount of available PoE converted power, wherein the computing system includes a display including a backlight to that derives power only from a second voltage rail that is separate and distinct from the first voltage rail and wherein the backlight varies in brightness as converted PoE power provided via the second rail to the backlight varies to limit the total amount of converted PoE power consumption, wherein the power meter is to:
compare the total converted POE power consumption of the computing system to a second threshold;
maintain assertion of the signal based on the power consumption exceeding the second threshold; and
de-assert the signal based on the power consumption being below the second threshold; and
wherein at least an amount of power provided to a processor in the computing system is not limited.

4. The power converter of claim 3, wherein the power meter is to assert the signal that power consumption is to be limited based on power consumption exceeding the upper threshold by a first amount.

5. The power converter of claim 3, wherein the power meter is to assert the signal that power consumption is to be limited based on power consumption exceeding the upper threshold during a first duration.

6. The power converter of claim 3, wherein the power meter is to de-assert the signal based on a delay of time during which power consumption does not exceed the second threshold.

7. A method, comprising:
monitoring, via a first rail, a total amount of converted PoE (Power over Ethernet) power consumption of a computing system that is to draw power from an amount of available PoE converted power to power a plurality of computing systems components of the computing system;
comparing the total amount of converted PoE power consumption to an upper threshold corresponding to a PoE power class associated with the computing system;
asserting a signal to limit the total amount of converted PoE power consumption at the computing system based on the comparing; and
limiting converted PoE power consumption of a computing system component of the plurality of computing system components while a converted PoE power consumption of at least one other computing system component in the computing system is not limited, wherein the computing system component is a display including a back light deriving power only from a second voltage rail that is separate and distinct from the first voltage rail and a brightness of the back light is reduced based on the signal to limit the total amount of converted PoE power consumption;
comparing the total converted POE power consumption of the computing system to a second threshold;
maintaining assertion of the signal based on the power consumption exceeding the second threshold; and
de-asserting the signal based on the power consumption being below the second threshold; and
wherein at least an amount of power provided to a processor in the computing system is not limited.

8. The method of claim 7, further comprising de asserting the signal based on power consumption not exceeding the second threshold for the duration of a time delay.

9. The method of claim 7, further comprising asserting the signal to limit power consumption based on a first power reduction rate associated with the upper threshold, and asserting the signal to limit power consumption based on a second power reduction rate associated with the second threshold.

10. The method of claim 7, further comprising monitoring power consumption based on a first voltage output of a PoE power converter, and adjusting power consumption of components of the computing system associated with a second voltage output of the PoE power converter.

11. The method of claim 7, further comprising asserting a signal to reduce the display brightness successively over time if a total amount of converted PoE power consumption remains within a range of the upper threshold of a PoE power class associated with the computing system despite earlier power consumption reduction signal assertions.

12. The method of claim 7, further comprising asserting a signal to reduce the display brightness by a variable amount depending on proximity of the total amount of converted PoE power consumption to the upper threshold of a PoE power class associated with the computing system.

13. The method of claim 7, further comprising asserting a signal to reduce the display brightness when the total amount of converted PoE power consumption is proximate to but below the upper threshold of a PoE power class associated with the computing system.

14. The computing system of claim 1, wherein the brightness of the back light is reduced based on the signal.

* * * * *